United States Patent [19]
Nishida

[11] Patent Number: 4,794,547
[45] Date of Patent: Dec. 27, 1988

[54] ROBOT CONTROL SYSTEM

[75] Inventor: Azusa Nishida, Narashino, Japan

[73] Assignees: Hitachi, Ltd., Tokyo; Hitachi Keiyo Engineering Co. Ltd., Narashino, both of Japan

[21] Appl. No.: 896,869

[22] Filed: Aug. 15, 1986

[30] Foreign Application Priority Data

Aug. 21, 1985 [JP] Japan ................................. 60-181711

[51] Int. Cl.$^4$ .............................................. G05B 19/42
[52] U.S. Cl. ........................................ 364/513; 901/3; 901/9; 901/15; 364/183
[58] Field of Search ........................ 364/513, 170, 183; 318/568, 632; 901/2-5, 9, 15, 40, 47

[56] References Cited

U.S. PATENT DOCUMENTS

| | | | |
|---|---|---|---|
| 4,445,184 | 4/1984 | Noguchi | 364/191 |
| 4,481,592 | 11/1984 | Jacobs et al. | 364/513 |
| 4,575,802 | 3/1986 | Walsh et al. | 364/513 |
| 4,590,578 | 5/1986 | Barto, Jr. et al. | 364/513 |
| 4,594,670 | 6/1986 | Itoh | 364/513 |
| 4,670,849 | 6/1987 | Okada et al. | 364/192 |

Primary Examiner—Jerry Smith
Assistant Examiner—Allen MacDonald
Attorney, Agent, or Firm—Fay, Sharpe, Beall, Fagan, Minnich & McKee

[57] ABSTRACT

In a robot, an object to be controlled, e.g., a working tool mounted on a robot wrist is purposively moved in accordance with data taught in advance. In case the object is encountered with a shaping or mounting error, a correction is accordingly required. This requirement makes it necessary to generate a desired error vector so that the robot may be moved while correcting the taught data in accordance with that vector. The object can be moved in a manual mode with its location being fixed while changing its position. In case, however, the object is accompanied by the shaping error or the like, not only the position but the location is changed following the position changing operation. The error vector can be arithmetically determined from data concerning such locational change.

10 Claims, 3 Drawing Sheets

FIG. 6

| TRANSFORMATION NUMBER (i) | OLD COORDINATE SYSTEM | NEW COORDINATE SYSTEM | ROTATIONAL MATRIX $R_i(\theta_i)$ | ORIGIN SHIFTING MATRIX $S_i$ |
|---|---|---|---|---|
| i=1 | COORDINATES RESTRAINED BY FIXED BASE 510. ORIGIN AT $\theta_2$ | COORDINATES RESTRAINED BY SWIVEL BASE 520. ORIGIN AT $\theta_2$ | ROTATION OF $\theta_1$ ON z AXIS. $R_1(\theta_1)$ CONFORMS TO Eq. (6) | NO SHIFT. $S_1 = \begin{pmatrix} 0 \\ 0 \\ 0 \end{pmatrix}$ |
| i=2 | COORDINATES RESTRAINED BY SWIVEL BASE 520. ORIGIN AT $\theta_2$ | COORDINATES RESTRAINED BY 1ST ARM 530. ORIGIN AT $\theta_2$ | ROTATION OF $\theta_2$ ON y AXIS. $R_2(\theta_2)$ CONFORMS TO Eq. (5) | NO SHIFT. $S_2 = \begin{pmatrix} 0 \\ 0 \\ 0 \end{pmatrix}$ |
| i=3 | COORDINATES RESTRAINED BY 1ST ARM 530. ORIGIN AT $\theta_2$ | COORDINATES RESTRAINED BY 2ND ARM 540. ORIGIN AT $\theta_3$ | ROTATION OF $\theta_3$ ON y axis. $R_3(\theta_3)$ CONFORMS TO Eq. (5) | SHIFT BY $\ell_2$ IN z AXIS DIRECTION $S_3 = \begin{pmatrix} 0 \\ 0 \\ \ell_2 \end{pmatrix}$ |
| i=4 | COORDINATES RESTRAINED BY 2ND ARM 540. ORIGIN AT $\theta_3$ | COORDINATES RESTRAINED BY THE OUTPUT SHAFT OF ARTICULATION $\theta_4$. ORIGIN AT $\theta_4$ | ROTATION OF $\theta_4$ ON y AXIS. $R_4(\theta_4)$ CONFORMS TO Eq. (5) | SHIFT BY $\ell_3$ IN x AXIS DIRECTION $S_4 = \begin{pmatrix} \ell_3 \\ 0 \\ 0 \end{pmatrix}$ |
| i=5 | COORDINATES RESTRAINED BY THE OUTPUT SHAFT OF ARTICULATION $\theta_4$. ORIGIN AT $\theta_4$ | COORDINATES RESTRAINED BY ROBOT WRIST 590. ORIGIN AT P | ROTATION OF $\theta_5$ ON z AXIS. $R_5(\theta_5)$ CONFORMS TO Eq. (6) | SHIFT BY $-\ell_4$ IN z AXIS DIRECTION $S_5 = \begin{pmatrix} 0 \\ 0 \\ -\ell_4 \end{pmatrix}$ |

ROBOT CONTROL SYSTEM

BACKGROUND OF THE INVENTION

1. Field of the Invention

The present invention relates to a robot control system which is made capable of utilizing data for a robot, which are taught in advance, even if an object to be controlled, such as a working tool which is fixed on a robot wrist, is encountered with shaping or mounting errors.

2. Description of the Prior Art

A robot controls the location and position of a controlled object, which is fixed on the wrist thereof, such as a welding torch in accordance with data taught in advance. This makes it impossible to use the original taught data if the controlled object has an error in shape or size or if the controlled object is improperly attached to the robot wrist. This makes it necessary to make an adjustment for eliminating the shaping, sizing or mounting error(s) of the controlled object. This adjustment takes a long time and is so physically acted upon the object that a special jig or gauge is required. It is therefore desired to eliminate the physical adjustment and, if possible, the use of such special jig or gauge.

SUMMARY OF THE INVENTION

The present invention is equipped with means for computing, storing and utilizing an error vector indicating an error in a wrist coordinate system restrained by a robot wrist, i.e., the locational change of an object with respect to the robot wrist so that a robot may be controlled by using original taught data without any physical adjustment of the object.

It is, therefore, an object of the present invention to eliminate such a physical adjustment of the object using a gauge as accompanies the locational change of the object.

Another object of the present invention is to make it possible to effectively control the robot by using the original taught data while omitting the physical adjustment of the object.

Still another object of the present invention is to arithmetically determine an error vector which is required for utilizing the original taught data for the robot control.

A further object of the present invention is to make it possible to compute the error vector without using any gauge or the like by noting the locational change of the object, which is caused following the change in the position of the controlled object when the robot is controlled to change the position only.

The present invention is premised on a robot control system for controlling the location and position of the controlled object fixed on the robot wrist in accordance with the data taught in advance. These taught data contain at least the locational and positional data but their teaching method may be arbitrary. The location of the controlled object described herein is that which is left unchanged irrespective of any positional change, and the control point is preset as a specific point having a relation to a prescribed object. The so-called "articulated robot" may sometimes adopt the taught data in the robot coordinate system based on the drive quantity (e.g., the angle of rotation of each articulation) of a robot drive unit. In this case, the locational and positional data cannot be formally discriminated, which is still sufficient for the present invention.

The present invention is equipped with: means for computing a error vector indicating an error in a wrist coordinate system restrained by the robot wrist, i.e., the locational change of the object with respect to the robot wrist; and means for storing the computed error vector. The wrist coordinate system restrained by the robot wrist has its coordinate axis moving in association with the robot wrist or the object fixed on the former. As a result, the error vector is left unchanged even, if the controlled object moves with the robot wrist, but is changed to correspond to the locational change of the object with respect to the robot wrist. For example, a welding torch is imagined as an controlled object and has its leading end assumed as the control point. If the welding torch is hit, its shape is changed so that the location of the control point at its leading end is also changed. This change is an error vector which provides three-dimensional data having directions and lengths. This error vector is also generated even in case the old object on the robot wrist is replaced by new one.

The present invention is equipped with command value computing means for computing a command value for the robot drive unit, from which the locational change concerning the object, i.e., the error, is eliminated in accordance with the taught data of the taught data memory means and the error vector of the error vector memory means. This command value is exemplified in an articulated robot by that of an angle of rotation in each articulation (i.e., the robot drive unit). The taught data are a series of operation programs containing the locational and positional data at each step and will change in accordance with the advance of the steps, but the common error data can be used for computing the command value so long as no error is newly caused.

BRIEF DESCRIPTION OF THE DRAWINGS

FIG. 6 is an explanatory diagram showing the processes of coordinate transformations.

DESCRIPTION OF THE PREFERRED EMBODIMENT

Figure 1:
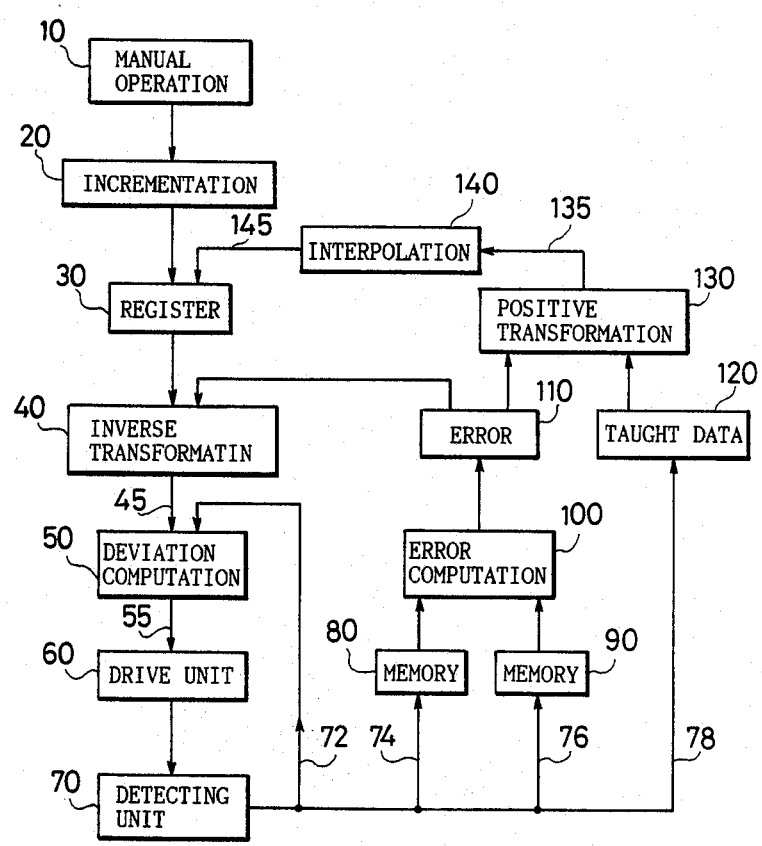
FIG. 1 is a flow chart for explaining a control system according to the present invention.

An embodiment shown in FIG. 1 will be described in the following with additional reference to other drawings. A block 60 of FIG. 1 is the drive unit of a robot body and constitutes a closed loop servo control circuit together with a deviation computing circuit 50 and a detecting unit 70. This detecting unit 70 such as an encoder detects the operation of the drive unit 60 and has its present output value 72 compared with a command value 45 so that the drive unit 60 is driven to reduce the deviation output 55 inbetween to zero. In accordance with this, angles of rotation corresponding to $\theta_1$, $\theta_2$, $\theta_3$, $\theta_4$ and $\theta_5$ of FIG. 2 change purposely.

Figure 2:
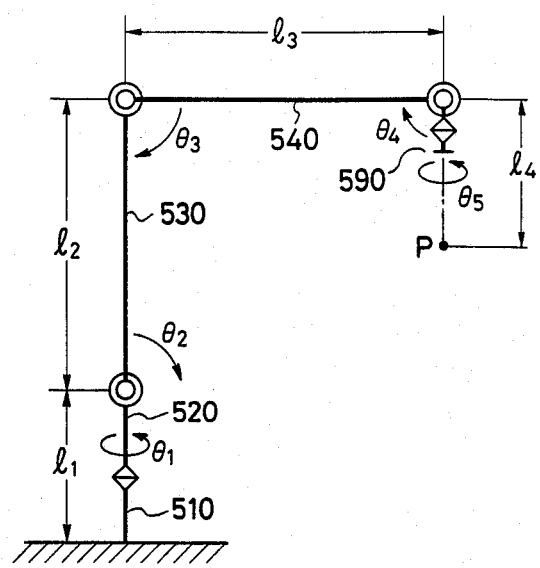
FIG. 2 is a schematic diagram showing the mechanism of a robot body.

The above angles $\theta_1$, $\theta_2$, $\theta_3$, $\theta_4$ and $\theta_5$ of FIG. 2 designate the respective articulations or angles of rotation of an articulated robot and correspond to the drive unit 60 of FIG. 1. The robot body in this embodiment is five-articulated to have five degrees of freedom. Reference numeral 510 designates a fixed base fixed on a floor; numeral 520 a swivel base capable of rotating at the angle $\theta_1$ with respect to the fixed base 510; numeral 530 a first arm capable of rotating at the angle $\theta_2$; and numeral 540 a second arm capable of rotating at the angle $\theta_3$. Reference numeral 590 designates a robot wrist which is capable of rotating at the angles $\theta_4$ and $\theta_5$ with respect to the second arm 540 and which corresponds to the output end of the robot having five degrees of freedom. An object 600 to be controlled is fixed on the flange of the robot wrist 590. Designated at reference letter P is a control point which is positioned in a prescribed relationship to the robot wrist 590 or the object 700 fixed on the former. In this embodiment, the control point P is set on the axis of rotation of the articulation $\theta_5$ and is apart by a length $\theta_4$ from the center of rotation of another articulation $\theta_4$. The controlled object 600 is a widely defined working tool such as a hand or a fastening driver and corresponds to a welding torch in this embodiment. The welding torch 600 has its leading end coming into coincidence with the control point P when its center line is extended by a specified length. The control point P can be visually confirmed, although imaginary, in relation to the controlled object 600 as described above. The control point P represents the locational change of the controlled object 600 so that either the location of the point P of the controlled object 600 or the position of the same around the point P can be controlled by driving the drive unit 60 (i.e., $\theta_1$, $\theta_2$, $\theta_3$, $\theta_4$ and $\theta_5$), as described above. These controls can be continuously executed in accordance with taught data which are taught in advance in a taught data memory means 120 of FIG. 1.

Figure 3:
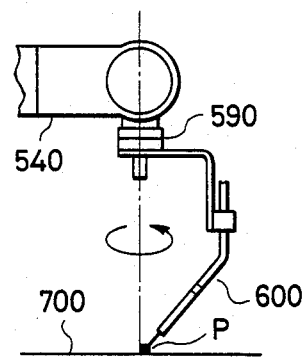
FIG. 3 is a detailed view showing the wrist portion of the same.

The teaching operation of the taught data will be described in the following. By manually operating a not-shown robot control board or teaching box key board, the location and position of the control point P are purposively set in relation to a work 700 of FIG. 3, for example. This setting corresponds to the steps of a block 10 of FIG. 1. Following the manual operation 10, a necessary incrementation 20 is conducted. This is for changing the location and position of the control point P, but its details are omitted here. The result of the incrementation 20 is set in a register 30 and is subjected to an inverse coordinate transformation until it is outputted as the command value 45. If the control is made in such a manual mode and if it is judged that the location and position concerning the control point P are proper, output data 78 from the detecting unit 70 at that time are introduced as the taught data or their portion into the memory means 120 by another manual operation according thereto.

Figure 4:
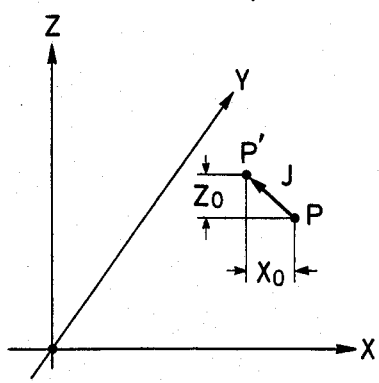
FIG. 4 is a coordinate diagram showing an error vector.

Here, the error vector will be described with reference to FIG. 4. Reference letter J appearing in FIG. 4 designates the error vector which can be illustrated by an arrow having the point P as a start and a point P' as an end. The point P is an old control point, and the point P' is a new control point. For example, if the welding torch 600 as the controlled object is replaced by new one or hit, the control point is shifted from the old one P to the new one P' in relation to the welding torch 600. This is because the welding torch 600 is accompanied by the shaping, sizing or mounting error. If the taught data 120 are used as they are for the control, the old point P is controlled and has to be corrected to the new point P'. In FIG. 4, the error vector J is designated by a coordinate system XYZ which is restrained by the floor or fixed base 510 of FIG. 2. If this coordinate system XYZ is used, the coordinates of the error vector J can be expressed by [$x_0 y_0 z_0$]. The coordinate [$x_0 y_0 z_0$] of the error vector J thus expressed will change in accordance with the positional change of the robot wrist 590 or the object 600.

Here, a variety of coordinate of systems will be described in the following. The coordinate system XYZ is restrained by the fixed base 510, as has been described hereinbefore. This is especially called the general coordinate system which is the most suitable for a person to conceive a three-dimensional space. Likewise, there can be conceived a coordinate system which is restrained by the swivel base 510. There can also be conceived a coordinate system which is restrained by the first arm 530 and the second arm 540. There can be further conceived a coordinate system which is restrained by the output shaft of the articulation $\theta_4$ and a coordinate system which is restrained by the robot wrist 590. The last is especially called here a wrist coordinate system. This wrist coordinate system is designated as $X'Y'Z'$. There are totally six coordinate systems from the general coordinate system XYZ to the wrist coordinate system $X'Y'Z'$. This number is one subtracted by 1 from the number of degrees of freedom of the robot, and the location of the control point P or P' and the position therearound can be described by any of those coordinate systems. This similarly applies to the error vector J.

Here, transformation between the respective coordinate systems will be thought in the following. Here, these coordinate systems are all orthogonal. The transformation between the wrist coordinate system $X'Y'Z'$ and the general coordinate system XYZ is expressed by the following equation (1):

$$\begin{pmatrix} x_1 \\ y_1 \\ z_1 \\ 1 \end{pmatrix} = A_1 A_2 A_3 A_4 A_5 \begin{pmatrix} x_1' \\ y_1' \\ z_1' \\ 1 \end{pmatrix}. \quad (1)$$

The letters $x_1' y_1' z_1'$ appearing in the equation (1) designate the coordinates of an arbitrary point represented by the wrist coordinates $X'Y'Z'$, and the letters $x_1 y_1 z_1$ designate the coordinates of the same point viewed in the general coordinates XYZ. Letters $A_1$ to $A_5$ respectively designate a 4-row, 4-column coordinate transformation matrix, which is expressed by the following equation. Incidentally, letter i appearing in the following equation takes any of 1 to 5 in the present embodiment:

$$Ai = \begin{pmatrix} K_{11i} & K_{12i} & K_{13i} & K_{14i} \\ K_{21i} & K_{22i} & K_{23i} & K_{24i} \\ K_{31i} & K_{32i} & K_{33i} & K_{34i} \\ 0 & 0 & 0 & 1 \end{pmatrix}. \quad (2)$$

In the above equation (2), the 3-row, 3-column portion (from $K_{11i}$ to $K_{33i}$) the coordinate transformation matrix expressing a rotation, and letters $K_{14i}$, $K_{24i}$ and $K_{34i}$ designate the coordinates expressing the displacement of an origin from the old to new coordinate systems. All their coefficients take zero unless the original is not shifted in this meanwhile.

The equation (2) will be described more with a supplement. If the 3-row, 3-column portion of the equation (2) is expressed by Ri ($\theta$i) and if the letters $K_{14i}$, $K_{24i}$ and $K_{34i}$ are expressed by Si, the above equation (2) can be formally expressed by the following equation:

$$Ai = \begin{pmatrix} Ri & (\theta i) & Si \\ 0 & 0 & 0 & 1 \end{pmatrix}. \quad (3)$$

Now, if the transformation from the old to new coordinate systems is effected by a rotation on the x axis of the old coordinate system, the expresion Ri ($\theta$i) takes the form of the following equation (4). On the other hand, the expression Ri ($\theta$i) takes the forms of the following equations (5) and (6), respectively, for the rotations on the y and z axes. Here, $\theta$i designates the respective quantities of rotation, and the expression Ri ($\theta$i) is through as a function having the variable $\theta$i:

$$R(\theta i) = \begin{pmatrix} 1 & 0 & 0 \\ 0 & \cos\theta i & -\sin\theta i \\ 0 & \sin\theta i & \cos\theta i \end{pmatrix}; \quad (4)$$

$$Ri(\theta i) = \begin{pmatrix} \cos\theta i & 0 & \sin\theta i \\ 0 & 1 & 0 \\ -\sin\theta i & 0 & \cos\theta i \end{pmatrix}; \quad (5)$$

and $$Ri(\theta i) = \begin{pmatrix} \cos\theta i & -\sin\theta i & 0 \\ \sin\theta i & \cos\theta i & 0 \\ 0 & 0 & 1 \end{pmatrix}. \quad (6)$$

Figure 5:
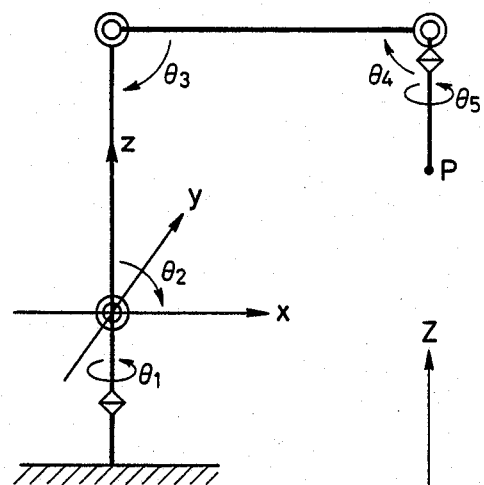
FIG. 5 is an explanatory diagram showing the relationship between the robot body and the coordinate system.

Here, the coordinate transformation matrix (Ai) of the robot body of FIG. 2 is rearranged, if taken into consideration, as shown in FIG. 6. The old coordinate system for i=1 of FIG. 6 is the aforementioned general one. On the other hand, the new coordinate system for i=5 is the wrist one. In FIG. 6, for example, the phrase "the origin at $\theta_2$" implies that the origin of the coordinate system under consideration is present at the center of the articulation $\theta_2$. On the other hand, for example, the phrase "the rotation of $\theta_1$ on the z axis" implies that each reference axis of the new coordinate system rotates in the quantity "$_1$ on the reference axis z of the old coordinate system". FIG. 5 shows such one coordinate system x,y,z in relation to the robot body of FIG. 2 as is coincident with the old or general coordinate system for i=1. Moreover, this coordinate system x,y,z is coincident with the new one for i=1 at $\theta_1=0$ and further with the new one for i=2 at $\theta_1=0$ and $\theta_2=0$. In FIG. 6, for example, the coordinate transformation matrix A3 for effecting transformation from the old to new coordinate systems for i=3 is expressed by the following equation:

$$A_3 = \begin{pmatrix} R_3 & (\theta_3) & S_3 \\ 0 & 0 & 0 & 1 \end{pmatrix} = \begin{pmatrix} \cos\theta_3 & 0 & \sin\theta_3 & 0 \\ 0 & 1 & 0 & 0 \\ -\sin\theta_3 & 0 & \cos\theta_3 & l_2 \\ 0 & 0 & 0 & 1 \end{pmatrix}. \quad (7)$$

In the equation (7), letter $\theta_2$ designates the length of the first arm 530, which can be handled as a constant. Since the variable in the equation (7) is $\theta_3$, therefore, the coordinate transforming matrix A3 can be described in the form of A3 ($\theta_3$) by considering it as a function of $\theta_3$. Likewise, the equation (1) can be expressed by the following equation:

$$\begin{pmatrix} x_1 \\ y_1 \\ z_1 \\ 1 \end{pmatrix} = A_1(\theta_1)A_2(\theta_2)A_3(\theta_3)A_4(\theta_4)A_5(\theta_5) \begin{pmatrix} x_1' \\ y_1' \\ z_1' \\ 1 \end{pmatrix}. \quad (8)$$

The origin in the new or wrist coordinate system (X', Y', Z') for i=5 in FIG. 6 is coincident with the control point P. If the coordinate values when the coordinates (0, 0, 0) of the point P are transformed into the general coordinate system (X, Y, Z) are designated at $x_p y_p z_p$, the following equation is obtained in accordance with the equation (8):

$$\begin{pmatrix} x_p \\ y_p \\ z_p \\ 1 \end{pmatrix} = A_1(\theta_1)A_2(\theta_2)A_3(\theta_3)A_4(\theta_4)A_5(\theta_5) \begin{pmatrix} 0 \\ 0 \\ 0 \\ 1 \end{pmatrix}. \quad (9)$$

The righthand side of the equation (9) expresses the location (or position) of the control point P in terms of the angles of rotation ($\theta_1$ to $\theta_5$) of the respective articulations ($\theta_1$ to $\theta_5$) of the robot body and is a kind of robot coordinate system. Hence, the equation (9) provides one coordinate transformation equation for transformation from the robot coordinate system on its righthand side of the general coordinate system on its lefthand side. This coordinate transformation is called a positive transformation.

A block 130 appearing in FIG. 1 is for the positive transformation, and the following equation (10) corrected from the equation (9) is adopted:

$$\begin{pmatrix} x_p' \\ y_p' \\ z_p' \\ 1 \end{pmatrix} = A_1(\theta_1)A_2(\theta_2)A_3(\theta_3)A_4(\theta_4)A_5(\theta_5) \begin{pmatrix} x_0' \\ y_0' \\ z_0' \\ 1 \end{pmatrix}. \quad (10)$$

The portion ($x_0'y_0'z_0'$) in the equation (10) expresses the error vector designated by the wrist coordinate system (X'Y'Z') so that the equation (10) becomes coincident with the equation (9) when the error vector J is zero. The portion ($x_p'y_p'z_p'$) expresses the location (or location vector) of the new control point P' in terms of the general coordinate system (XYZ). The execution of the computation of the equation (10) requires the data $(x_0'y_0'z_0')$ of the error vector J, which is stored in error vector memory means 110. The execution also requires the data on $\theta_1$ to $\theta_5$, which are obtained by reading out the taught data memory means 120.

As to the positive transformation containing the error vector J of the foregoing equation (10), the following specific computations are made with reference to FIGS. 2 and 6 and to the following equations (4) to (6):

$$x_p' = l_2 \text{COS}\theta_1 \text{SIN}\theta_2 + l_3 \text{COS}\theta_1 \text{COS}\theta_3' - l_4 \text{COS}\theta_1 \text{SIN}\theta_4' + \quad (11)$$
$$x_0' \text{COS}\theta_1 \text{COS}\theta_4' \text{COS}\theta_5 - x_0' \text{SIN}\theta_1 \text{SIN}\theta_5 -$$
$$y_0' \text{COS}\theta_1 \text{COS}\theta_4' \text{SIN}\theta_5 - y_0' \text{SIN}\theta_1 \text{COS}\theta_5 + z_0' \text{COS}\theta_1 \text{SIN}\theta_4';$$

$$y_p' = l_2 \text{SIN}\theta_1 \text{SIN}\theta_2 + l_3 \text{SIN}\theta_1 \text{COS}\theta' - l_4 \text{SIN}\theta_1 \text{SIN}\theta_4' + \quad (12)$$
$$x_0' \text{SIN}\theta_1 \text{COS}\theta_4' \text{COS}\theta_5 + x_0' \text{COS}\theta_1 \text{SIN}\theta_5 -$$
$$y_0' \text{SIN}\theta_1 \text{COS}\theta_4' \text{SIN}\theta_5 + y_0' \text{COS}\theta \, z_1 \text{COS}\theta_5 + z_0' \text{SIN}\theta_1 \text{SIN}\theta_4';$$

and $$z_p' = l_2 \text{COS}\theta_2 - l_3 \text{SIN}\theta_3' - l_4 \text{COS}\theta_4' - \quad (13)$$
$$x_0' \text{SIN}\theta_4' \text{COS}\theta_5 + y_0' \text{SIN}\theta_4' \text{SIN}\theta_5 + z_0' \text{COS}\theta_4',$$

wherein: $\theta_3' = \theta_2 + \theta_3;$ (14)

and $\theta_4' = \theta_2 + \theta_3 + \theta_4.$ (15)

Incidentally, the values $\theta_3'$ and $\theta_4'$ of the equations (14) and (15) were used in place of the angles of rotation $\theta_3$ and $\theta_4$ in the equations (11) to (13). This is because the respective motors for the drive unit 60 of the articulations $\theta_3$ and $\theta_4$ are fixed on the swivel base 520 so that their rotational outputs are transmitted to the respective articulations $\theta_3$ and $\theta_4$ through not-shown power transmission means (e.g., a chain mechanism). The angles of rotation $\theta_3'$ and $\theta_4'$ of the respective motors in this case conform to the equations (14) and (15).

Here, an interpolation shown by a block 140 of FIG. 1 will be described in the following. The taught data (120) designate the location and position of the controlled object 600 in time-series and non-continuous manners. Several points are interpolated between one point to another so that the locus inbetween may be smoothed or specified. Linear or arcuate interpolations are frequently used as such interpolation. This similarly applies to the present embodiment, in which the interpolation (140) is conducted in accordance with data 135 in the general coordinate system (XYZ) after the taught data (120) and the error vector J (110) have been subjected to the positive transformation (130) by the foregoing equation (10). These data according to the general coordinate system (XYZ) are the so-called "data on taught points", and the data on interpolated points based thereon are also those of the general coordinate system (XYZ). The aforementioned register 30 is set with such respective output data 145 from the interpolation means 140 as contain the taught points and interpolated points thus far described. The subsequent process is similar to the one in the case of the manual operation and is conducted in this case in a mode (i.e., an automatic operation mode) for the robot operation in accordance with the taught data 120.

Here, the inverse transformation means in the block 40 will be newly described in the following. The portion $x_p'y_p'z_p'$ of the equation (10) is determined by the positive transformation means 130. That portion expresses the location data on the new control point P'.

These data in the general coordinate system (XYZ) contain no data concerning the position of the new controlled object 600 around the new control point P' but are incomplete in this sense. For describing the position in the general coordinate system (XYZ), for example, there is known a method using the angles of rotation on the X and Y axes. The position can also be described by the angle of rotation $\theta_4$ and $\theta_5$ of the articulations $\theta_4$ and $\theta_5$ in the robot coordinate system $(\theta_1, \theta_2, \theta_3, \theta_4$ and $\theta_5)$. The present embodiment belongs to the latter method. As a result, the output data 145 from the interpolation means 140 are accurately $x_p'y_p'z_p'\theta_4\theta_5$ expressed in the general coordinates. Under the condition of the foregoing data being known, the inverse transformation means 40 determines the angles of rotation $(\theta_1\theta_2\theta_3)$ of the remaining unknown articulations $(\theta_1\theta_2\theta_3)$. These specific computations are as follows on the basis of FIGS. 2 and 6:

$$\theta_1 = \text{ARCSIN} \frac{-(x_0'\text{SIN}\theta_5 + y_0'\text{COS}\theta_5) \pm |y_p'|}{x_p'}; \quad (16)$$

$$\theta_2 = \text{ARCSIN} \frac{K_2 X\omega \pm Z\omega \sqrt{X\omega^2 + Z\omega^2 - K_2^2}}{X\omega^2 + Z\omega^2} \quad (17)$$

and $$\theta_3' = \text{ARCSIN} \frac{-K_3 Z\omega \pm X\omega \sqrt{X\omega^2 + Z\omega^2 - K_3^2}}{X\omega^2 + Z\omega^2}. \quad (18)$$

The double signs appearing in the above equations (16) to (18) are selected to fall within the robot operation range. Moreover, the undefined variables are expressed by the following equations:

$$\begin{pmatrix} a1 \\ b1 \\ c1 \end{pmatrix} = \begin{pmatrix} \text{COS}(-\theta_1) & 0 & \text{SIN}(-\theta_1) \\ 0 & 1 & 0 \\ -\text{SIN}(-\theta_1) & 0 & \text{COS}(-\theta_1) \end{pmatrix} \begin{pmatrix} x_p' \\ y_b' \\ z_p' \end{pmatrix}; \quad (19)$$

$$\begin{pmatrix} a2 \\ b2 \\ c2 \end{pmatrix} = \begin{pmatrix} \text{COS}(\theta_4') & 0 & \text{SIN}(\theta_4') \\ 0 & 1 & 0 \\ -\text{SIN}(\theta_4') & 0 & \text{COS}(\theta_4') \end{pmatrix} \times \quad (20)$$

$$\begin{pmatrix} \text{COS}(\theta_5) & -\text{SIN}(\theta_5) & 0 \\ \text{SIN}(\theta_5) & \text{COS}(\theta_5) & 0 \\ 0 & 0 & 1 \end{pmatrix} \begin{pmatrix} x_0' \\ y_0' \\ z_0' + L_4 \end{pmatrix};$$

$$X\omega = a_1 - a_2; \quad (21)$$

$$Z\omega = c_1 - c_2; \quad (22)$$

$$K_1 = \frac{X\omega^2 + Z\omega^2 + l_2^2 - l_3^2}{2l_2}; \quad (23)$$

and $$K_2 = \frac{X\omega^2 + Z\omega^2 + l_3^2 - l_2^2}{2l_3}. \quad (24)$$

In the specific computations described above, the angles of rotation $\theta_3'$ and $\theta_4'$ of the equations (14) and (15) were used in place of the angles of rotation $\theta_3$ and $\theta_4$ by the reasons similar to the aforementioned ones.

Next, the error computing means of a block 100 appearing in FIG. 1 will be described in the following. This means determines the error vector J in the wrist coordinate system and corresponds to the portion $(x_0'y_0'z_0')$ in the equation (10). Here, the equation (10) is interpreted at the level of the equations (4), (5) and (6) or the equation (7), and the equations (14) and (15) are substituted thereinto. As a result, the following equation is obtained:

$$\begin{pmatrix} x_p' \\ y_p' \\ z_p' \end{pmatrix} = B_1(\theta_1) \cdot B_2(\theta_2) \cdot L_2 + B_1(\theta_1) \cdot B_2(\theta_3') \cdot L_3 + \qquad (25)$$

$$B_1(\theta_1) \cdot B_2(\theta_4') \cdot B_1(\theta_5) \cdot \begin{pmatrix} x_0' \\ y_0' \\ z_0' + L_4 \end{pmatrix}.$$

The letters $B_1(\theta_1)$ and $B_1(\theta_5)$ appearing in the equation (25) are coordinate transformation matrixes having forms similar to that of the equation (6) so that they take the following form if the values $\theta_1$ and $\theta_5$ are represented by $\theta$:

$$B_1(\theta) = \begin{pmatrix} \cos\theta & -\sin\theta & 0 \\ \sin\theta & \cos\theta & 0 \\ 0 & 0 & 1 \end{pmatrix}. \qquad (26)$$

On the other hand, the letters $B_2(\theta_2)$, $B_2(\theta_3')$, and $B_2(\theta_4')$ appearing in the equation (25) are coordinate transformation matrixes having forms similar to that of the equation (5) so that they take the following form if the values $\theta_2$, $\theta_3'$ and $\theta_4'$ are represented by $\theta$:

$$B_2(\theta) = \begin{pmatrix} \cos\theta & 0 & \sin\theta \\ 0 & 1 & 0 \\ -\sin\theta & 0 & \cos\theta \end{pmatrix}. \qquad (27)$$

In the block 100, the error vector J $(x_0'y_0'z_0')$ is determined on the basis of the equation (25). In the practical operation, output data 74 and 76 of multiple positions of one point from the detecting unit 70 are used as parameters. If the operation is branched to the error vector measuring program by the manual operation 10, although not specifically shown in FIG. 1, the operator determines the one-point, multi-position manual operation 10. The operator positions the preceding control point P of the controlled object 600 in a characteristic point (e.g., an apex or corner whose position can be discriminated) on the work 700 and then depresses a not-shown confirmation button after the positioning operation. The operator repeats the positioning and confirming operations described above, upon each of which he changes the position of the controlled object 600. If the confirmation button is depressed, on the other hand, the output data 74 (or 76) from the detecting unit 70 at that time are stored in memory means 80 (or 90). When the program for the error vector measurement is completed, the error computation 100 is executed.

In accordance with the one-point, multi-position operation, a plurality of sets of data according to the number of the positions are stored in the memory means 80 and 90. The set number is at least two or more, preferably three or more. Now, it is assumed that the plural sets of data be expressed by the following equations:

$$\theta_1 = K_{11} \qquad \theta_1 = K_{21}$$
$$\theta_2 = K_{12} \qquad \theta_2 = K_{22}$$
$$\theta_3' = K_{13} \qquad \theta_3' = K_{23}$$
$$\theta_4' = K_{14} \qquad \theta_4' = K_{24}$$
$$\theta_5 = K_{15} \text{ and } \theta_5 = K_{25}$$

The plural sets of data specified above are those when their control points P are all positioned in a common location. Hence, the following equation holds by eliminating $(x_p'y_p'z_p')$ from the equation (25):

$$B_1(K_{11}) \cdot B_2(K_{12}) \cdot L_2 + B_1(K_{11}) \cdot B_2(K_{13}) \cdot L_3 + \qquad (28)$$

$$B_1(K_{11}) \cdot B_2(K_{14}) \cdot B_1(K_{15}) \cdot \begin{pmatrix} x_0' \\ y_0' \\ z_0' + L_4 \end{pmatrix} =$$

$$B_1(K_{21}) \cdot B_2(K_{22}) \cdot L_2 + B_1(K_{21}) \cdot B_2(K_{23}) \cdot L_3 +$$

$$B_1(K_{21}) \cdot B_2(K_{24}) \cdot B_1(K_{25}) \cdot \begin{pmatrix} x_0' \\ y_0' \\ z_0' + L_4 \end{pmatrix}.$$

The above equation (28) takes the following form if it is rearranged in respect of $(x_p'y_p'z_p')$: wherein:

$$D \cdot \begin{pmatrix} x_0' \\ y_0' \\ z_0' \end{pmatrix} + E. \qquad (29)$$

$D = B_1(K_{11}) \cdot B_2(K_{14}) \cdot B_1(K_{15}) - B_1(K_{21}) \cdot B_2(K_{24}) \cdot B_1(K_{25})$ $E = B_1(K_{21}) \cdot B_2(K_{22}) \cdot L_2 - B_1(K_{11}) \cdot B_2(K_{12}) \cdot L_2 +$ $B_1(K_{21}) \cdot B_2(K_{23}) \cdot L_3 - B_1(K_{11}) \cdot B_2(K_{13}) \cdot L_3 + B_1(K_{21}) \cdot$ $B_2(K_{24}) \cdot B_1(K_{25}) \cdot L_4 - B_1(K_{11}) \cdot B_2(K_{14}) \cdot B_1(K_{15}) \cdot L_4$ The value $(x_p'y_p'z_p')$ is determined from the equation (29) in the following form:

$$\begin{pmatrix} x_0' \\ y_0' \\ z_0' \end{pmatrix} = D^{-1} \cdot E. \qquad (30)$$

Since the equation (30) is a ternary, simultaneous linear equation, it can be solved to determined the value $(x_p'y_p'z_p')$. This result is stored in the error vector memory means 110. In case the positional change accompanying the one-point, multi-position operation happens to be unique, as in case both the values D and E in the equation (29) are zero, the error vector J cannot be determined. In this particular case, the number of the simultaneous equations may be increased by using three sets or more of data.

The error vector J in FIG. 1 is referred to for the position transformation 130 and for the inverse transformation 40. This respect will be a little supplemented in the following. The error vector J to be referred to for the positive transformation 130 is one concerning the controlled object 600 when in the teaching operation. On the other hand, the error vector J to be referred to for the inverse transformation 40 is one concerning the controlled object 600 when in the operation (which is based on the taught data 120). As a result, when those error vectors J are not coincident (as in case the controlled object is hit or replaced by new one after the taught data 120 has been generated), it is necessary to store the two kinds of error vectors J in the memory means 110 so that they may be separately used. If the error vectors J are identical, on the contrary, the same error vectors J are referred to for both the positive transformation 130 and the inverse transformation 40. This may apparently nullify the result by conducting the minus correction after the plus correction, but not in practice. If the interpolation 40 of FIG. 1 is linear, it is not the new control point P' but the old point P to follow the linear locus in the presence of the error vector J. Despite this fact, even for the error vector J common between the positive transformation 130 and the inverse transformation 40, the locus of the new point P' is straight if the common error vector J is referred to. This corresponds to the case of linear interpolation. However, like discussion applies to the case of another arcuate interpolation. In the latter case, the arcuate locus of not the old point P but the new point P' is warranted.

What is claimed is:

1. A robot control system for controlling the location and position of an object to be controlled, which is fixed on a robot wrist, in accordance with data taught in advance, comprising: taught data memory means for storing the taught data; means for computing an error vector indicating an error in a wrist coordinate system corresponding to the positional error of said object with respect to said robot wrist; memory means for storing the computed error vector in said wrist coordinate system; command value computing means for computing a command value for a robot drive unit to correct said positional error concerning said object in accordance with the taught data of said taught data memory means and the error vector of said error vector memory means; and means for controlling said robot drive unit based on said command value.

2. A robot control system according to claim 1, further comprising means for detecting the operation of the robot drive unit and producing correlated output data, and wherein said means for computing computes the error vector in said wrist coordinate system in accordance with the output data of the means for detecting the operation of the robot drive unit.

3. A robot control system according to claim 2, wherein said means for detecting produces the output data in response to a change in the orientation of the object with respect to the robot wrist.

4. A robot control system according to claim 1, further comprising: positive transformation means for effecting a positive coordinate transformation from the taught data in the robot coordinate system and the error vector in said wrist coordinate system to produce output data in a general coordinate system; interpolation means for effecting an interpolation to produce output data from the output data of said positive transformation means; and inverse transformation means for effecting an inverse transformation of the output data of said interpolation means and the error vector indicating an error in said wrist coordinate system to produce output data in said robot coordinate system as input data for the command value computing means for said robot drive unit.

5. A robot control system according to claim 4, wherein said taught data memory means further stores the error vector.

6. A robot control method, for controlling the location and position of an object to be controlled, which is fixed on a robot wrist, in accordance with data taught in advance, comprising the steps of:
   storing the taught data;
   computing an error vector indicating an error in a wrist coordinate system corresponding to the positional error of the object with respect to the robot wrist;
   storing the computed error vector in the wrist coordinate system;
   computing a command value for a robot drive unit to correct the positional error concerning the object, in accordance with the taught data stored and the error vector stored; and
   controlling said robot drive unit based on said command value.

7. A robot control method according to claim 6, further comprising the steps of:
   detecting the operation of the robot drive unit and producing correlated output data;
   said step of computing the error vector in the wrist coordinate system computes in accordance with the output data of said step of detecting the operation of the robot drive unit.

8. A robot control method according to claim 7, wherein said step of detecting produces the output data in response to a change in the orientation of the object with respect to the robot wrist.

9. A robot control method according to claim 8, further including effecting a positive coordinate transformation from the taught data in the robot coordinate system and the error vector in the wrist coordinate system to produce output data in a general coordinate system;
   effecting an interpolation to produce output data from the output data of the step of effecting positive transformation; and
   effecting inverse transformation of the output data of the step of effecting interpolation and the error vector indicating an error in the wrist coordinate system to produce output data in the robot coordinate system as input data for said step of computing the command value for the robot drive unit.

10. A robot control method according to claim 9, wherein said step of storing the taught data includes storing the error vector.

* * * * *